US006649758B2

(12) United States Patent
Rothe et al.

(10) Patent No.: US 6,649,758 B2
(45) Date of Patent: *Nov. 18, 2003

(54) PREPARATION OF TRANS-THIAZINEINDIGO PIGMENTS

(75) Inventors: Petra Maria Rothe, Kelkheim (DE); Leonhard Unverdorben, Nidderau (DE); Bruno Piastra, Huningue (FR)

(73) Assignee: Clariant Finance (BVI) Limited, Tortola (VG)

( * ) Notice: Subject to any disclaimer, the term of this patent is extended or adjusted under 35 U.S.C. 154(b) by 235 days.

This patent is subject to a terminal disclaimer.

(21) Appl. No.: 09/886,569

(22) Filed: Jun. 21, 2001

(65) Prior Publication Data
US 2002/0004596 A1 Jan. 10, 2002

(30) Foreign Application Priority Data
Jun. 21, 2000 (DE) .......................... 100 30 475

(51) Int. Cl.⁷ .................... C07D 279/16; C07D 417/04; C07D 277/82

(52) U.S. Cl. ................. 544/47; 54/48; 54/52; 548/164

(58) Field of Search ............. 544/48, 52, 47; 548/104, 164

(56) References Cited

U.S. PATENT DOCUMENTS

| 3,803,139 A | 4/1974 | Kaul ................ 106/97 |
| 4,752,301 A | 6/1988 | Koch ............... 8/653 |
| 5,981,766 A | 11/1999 | Bauer et al. ......... 549/56 |
| 6,200,378 B1 * | 3/2001 | Piasta et al. ........ 106/413 |
| 6,339,084 B1 * | 1/2002 | Kaul et al. ......... 514/224.2 |

FOREIGN PATENT DOCUMENTS

| DE | 21 51 723 | 4/1972 |
| DE | 25 36 120 | 3/1977 |
| EP | 1 036 821 | 9/2000 |
| WO | WO 98/32800 | 6/1998 |

OTHER PUBLICATIONS

XP–002140383, Kaul, B. L., "Studies on Heterocyclic Colouring Matter" Helvetica Chimica Acta, Verlag Helvetica Chimica Acta. Baseel, CH, Bd. 57, Nr. 8, 1974, pp. 2664–2678.

* cited by examiner

Primary Examiner—Venkataraman Balasubramanian
(74) Attorney, Agent, or Firm—Anthony A. Bisulca

(57) ABSTRACT

A process for preparing symmetrical or asymmetrical trans-thiazineindigo pigments of the formula (1)

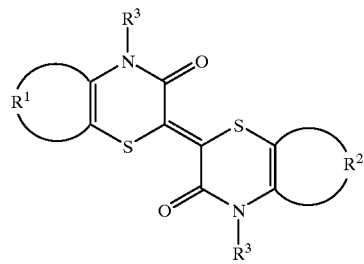

(1)

which comprises
a) condensing, in an aqueous medium, a compound of the formula (2) with a compound of the formula (3a) or (3b) or a compound of the formula (4) with a compound of the formula (3a) and/or (3b)

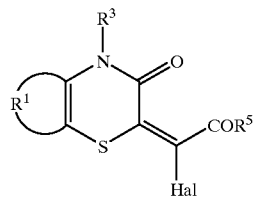

(2)

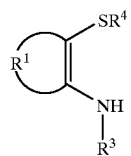

(3a)

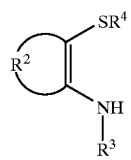

(3b)

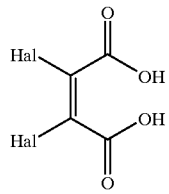

(4)

by maintaining the reaction mixture at a temperature between 30 and 65° C. for at least 1 hour and then
b) maintaining the reaction mixture at a temperature between 100 and 180° C. and a pressure between 2 and 50 bar for at least 1 hour in the presence of an amide.

15 Claims, No Drawings

PREPARATION OF TRANS-THIAZINEINDIGO PIGMENTS

BACKGROUND OF THE INVENTION

The present invention relates to an improved process for preparing symmetrical and asymmetrical trans-thiazineindigo pigments.

Thiazineindigo pigments are an industrially important class of organic pigments. They are preparable by reaction of carbo- or heterocyclic o-aminomercapto compounds with maleic acid derivatives in polar aprotic solvents (DE-A-2 151 723, DE-A-2 536 120). An improved process is described in WO 98/32 800 A1. However, existing processes are in need of improvement with regard to yield and product quality.

It is an object of the present invention to provide a process for preparing trans-thiazineindigo pigments which provides higher yields, purer and more brilliant products and also ecological and economic advantages compared with existing processes.

This object is surprisingly achieved by a simple stage reaction by maintaining certain, hereinbelow defined temperature and pressure conditions.

DESCRIPTION OF THE PREFERRED EMBODIMENTS

The present invention accordingly provide a process for preparing symmetrical or asymmetrical trans-thiazineindigo pigments of the formula (1)

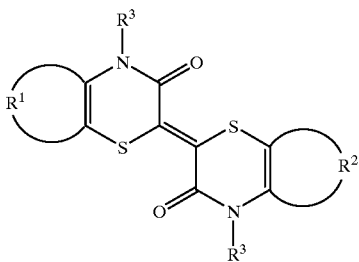

(1)

where $R^1$ and $R^2$ are identical or different and each represents a radical required to complete a substituted or unsubstituted aromatic or aliphatic carbocyclic or heterocyclic ring system, and $R^3$ is hydrogen, $C_1$–$C_{12}$-alkyl or phenyl, which comprises a) condensing, in an aqueous medium, a compound of the formula (2) with a compound of the formula (3a) or (3b) or a compound of the formula (4) with a compound of the formula (3a) and/or (3b)

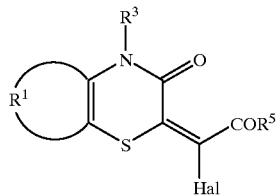

(2)

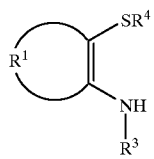

(3a)

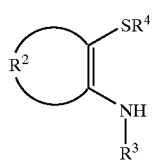

(3b)

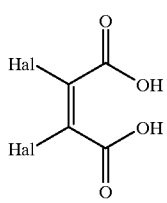

(4)

where $R^1$, $R^2$ and $R^3$ are each as defined above, $R^4$ is hydrogen or a metal ion selected from the group consisting of $Na^+$, $K^+$ and $Zn^{2+}/2$, $R^5$ is a leaving group, and Hal is Cl or Br;

by maintaining the reaction mixture at a temperature between 30 and 65° C. for at least 1 hour and then b) maintaining the reaction mixture at a temperature between 100 and 180° C. and a pressure between 1.5 and 50 bar, preferably between 2 and 20 bar, for at least 1 hour in the presence of an amide.

In symmetrical trans-thiazineindigo pigments $R^1$ and $R^2$ are the same.

In asymmetrical trans-thiazineindigo pigments, $R^1$ and $R^2$ are different.

Symmetrical trans-thiazineindigo pigments are obtained when the compound of the formula (2) is reacted with the compound of the formula (3a), the preferred molar ratio for (2):(3a) being about 1:1 to 1:5, especially 1:1 to 1:1.1.

Symmetrical trans-thiazineindigo pigments are also formed when the compound of the formula (4) is reacted with approximately twice the molar amount of the compound of the formula (3a) or (3b), preferably in a molar ratio of (4):(3a) or (3b) of 1:2 to 1:5, especially 1:2 to 1:2.2.

Asymmetrical trans-thiazineindigo pigments are formed on reacting the compound of the formula (2) with the compound of the formula (3b), the preferred molar ratio for (2):(3b) being about 1:1 to 1:5, especially 1:1 to 1:1.1.

Asymmetrical trans-thiazineindigo pigments are also obtained on reacting the compound of the formula (4) with an approximately equimolar amount of the compound (3a) and an approximately equimolar amount of the compound (3b), preferably in a molar ratio of (4):(3a+3b) of 1:2 to 1:3.

By using a mixture of the compounds (3a) and (3b) it is possible to obtain mixtures of asymmetrical products and the two symmetrical products, especially when the molar ratio of (3a):(3b) is not equimolar.

Instead of the compounds of the formulae (3a) and (3b) it is also possible to use the corresponding aminothiazoles of the formulae (3c) and (3d)

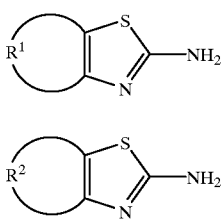

which are usually commercially available. Alkaline ring cleavage, for example in the presence of aqueous potassium hydroxide or sodium hydroxide solution and at temperatures between 100 and 200° C., preferably between 110 and 150° C., provides the o-aminomercapto compounds of the formulae (3a) and (3b), which are reacted as described above, if appropriate after acidification.

It is an important process engineering advantage that the process of the invention can be carried out as a simple stage reaction. The ring closure reaction, i.e., the condensation to the cis-thiazineindigo, takes place at temperatures between 30 and 65° C. in step a). Without the cis product being isolated, the reaction mixture is then heated under pressure in the presence of an amide (step b), and the isomerization to the desired trans product and the pigmentary conditioning take place at one and the same time. The amide can be present in the reaction mixture from the start and/or added prior to the heating as per b). The amount of amide is advantageously between 5 and 70% by weight, especially between 20 and 40% by weight, based on the total weight of the reaction mixture in step b). Useful amides are preferably cyclic carboxamides and sulfonamides, especially N-methylpyrrolidone.

The aqueous medium contains water, if appropriate an acid or a base and optionally a water-soluble solvent, for example an alcohol. Useful acids include for example carboxylic acids, for example acetic acid, inorganic acids, for example sulfuric acid, hydrochloric acid or phosphoric acid. It is also possible for salts of these acids, especially buffers, to be present. Useful bases include for example sodium hydroxide and potassium hydroxide or organic bases, such as triethylamine.

The acids are advantageously present in the aqueous medium in such an amount that the pH is between 0 and 3, preferably between 1 and 2, especially between 1 and 1.5, in steps a) and b). The amount of acid is preferably 10 to 40% by weight, especially 10 to 20% by weight, based on the total weight of the reaction mixture.

It has been found that the formation of coloristically unwelcome monocondensation products can be substantially suppressed by maintaining a certain temperature profile. The reaction mixture is maintained at a temperature between 30 and 65° C., preferably between 35 and 50° C., for at least 1 hour, preferably 1 to 6 hours, especially 2 to 4 hours.

To raise the space-time yield, it can be advantageous to distill some or all of the water out of the reaction medium after the condensation has taken place.

For isomerization and conditioning, the reaction mixture is heated in the presence of the amide and maintained at 100 to 180° C., preferably 110 to 160° C., especially 130 to 150° C., for at least 1 hour, preferably 1 to 8 hours, especially 2 to 5 hours. In a closed system, the pressure will automatically rise to 1.5 to 50 bar, preferably 2 to 50 bar, especially 5 to 10 bar.

The trans-thiazineindigo pigment formed is isolated by customary methods, for example distillative removal of the liquid medium or filtration of the pigment, washing and drying.

In a preferred embodiment of the process according to the invention, the reaction is effected in the presence of additives which inhibit the crystallization, for example quinacridonecarboxamides, quinacridonesulfonamides, thiazineindigocarboxamides or thiazineindigosulfonamides, for example those of the following formula:

where

P is a residue of a linear unsubstituted quinacridone or of a linear 2,9-dimethylquinacridone or of a thiazineindigo radical, m is from 1 to 4, and X is a group of the formula —$CONR^8R^9$ or —$SO_2NR^8R^9$, where $R^8$ and $R^9$ are independently H, $C_1$–$C_{18}$-alkyl, phenyl, naphthyl, $C_5$–$C_{10}$-cycloalkyl or

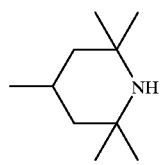

Furthermore, the presence of dispersing aids, for example a ®Sandopan, or wax can be advantageous.

In a further preferred embodiment of the process according to the invention, the reaction mixture is subjected to grinding, for example by means of a colloid mill, during the condensation and/or during the isomerization.

Preferred compounds prepared by the present process are those of the formula (1) where $R^1$ and $R^2$ are each a radical of the formula (a) to (i)

(a)

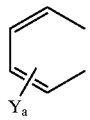

(b)

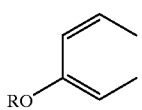

(c)

-continued

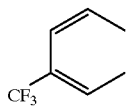 (d)

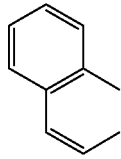 (e)

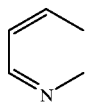 (f)

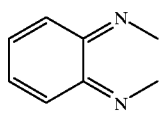 (g)

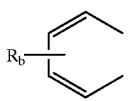 (h)

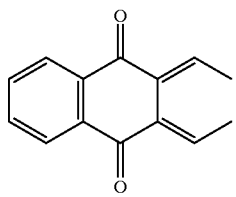 (i)

where
Y is a halogen, preferably chlorine or bromine, or a pseudohalogen, preferably CN,
R is branched or linear $C_1$–$C_8$-alkyl, preferably $C_1$–$C_4$-alkyl, especially methyl or ethyl,
a is 1, 2, 3 or 4, and
b is 1, 2, 3 or 4.
$R^3$ is preferably hydrogen, $C_1$–$C_6$-alkyl or phenyl, especially hydrogen, methyl.
In the starting compound of the formula (2), $R^5$ is preferably OH, Cl, Br, $C_1$–$C_5$-alkoxy.
The process of the invention provides particularly pure and brilliant trans-thiazineindigo pigments.
More particularly, the fraction of coloristically unwelcome monocondensation product is usually below 5% by weight, as measured by HPLC, whereas it is frequently formed in an amount of 10 to 15% by weight in hitherto customary processes.
Moreover, the simple stage reaction of the invention has significant ecological and economic advantages, since there is no need to isolate the cis product formed in the course of the condensation and inconvenient filtration, washing and drying steps can accordingly be eliminated. It is surprising that the presence of amides, especially NMP, will cause the cis product to isomerize to the trans product in high yields while at the same time undergoing pigmentary conditioning.
It may be pointed out in this connection that direct synthesis of the trans product, for example from the corresponding fumaric acid derivative instead of the maleic acid derivative of the formula (4), is unsuitable for industrial purposes, since the fumaric acid derivative is very costly and not commercially available.

EXAMPLES

Example 1

75.65 g of 6-chloro-2-aminobenzothiazole are added to 100 g of potassium hydroxide and 70 g of water in a reactor under nitrogen. The reaction mixture is refluxed for 12 hours with stirring. The batch is then diluted with 160 g of water and cooled down to 25° C. 120 g of 50% by weight sulfuric acid are added dropwise at 25° C. until a pH of 8 is obtained. This reaction mixture is passed over 2 hours into a mixture of 33 g of 2,3-dichloromaleic acid, 160 g of water and 0.7 g of ®Sandopan 2N dispersant. The reaction mixture is maintained at 40° C. during the process. Sufficient 50% by weight sulfuric acid is added for the pH to be 1.3±0.2.

Yellow cis-7,7'-dichlorobenzothiazineindigo precipitates in the process. 200 g of N-methylpyrrolidone and 0.2 g of glacial acetic acid are then added dropwise to the reactor and the reaction mixture is heated at 160° C. for 6 hours, resulting in an antogenous overpressure of 1 bar. The suspension is then filtered and the filtercake is washed with not NMP at 90° C.

This gives 55.2 g of trans-7,7'-dichlorobenzothiazineindigo (78.4% of theory).

Example 2

80.74 g of the tin salt of 2-amino-5-chlorothiophenol are added to 290 g of water in a reactor under nitrogen. This suspension is passed over 2 hours into a mixture of 33 g of dichloromaleic acid, 160 g of water and 0.7 g of Sandopan 2N dispersant. The reaction mixture is maintained at 40° C. in the process. Sufficient 50% by weight sulfuric acid is added for the pH to be 1.3±0.2.

Yellow cis-7,7'-dichlorobenzothiazineindigo precipitates in the process. 200 g of N-methylpyrrolidone and 0.2 g of glacial acetic acid are then added dropwise to the reactor and the reaction mixture is heated at 160° C. for 6 hours, resulting in an antogenous overpressure of 1 bar. The suspension is then filtered and the filtercake is washed with hot NMP at 90° C.

This gives 55.2 g of trans-7,7'-dichlorobenzothiazineindigo (78.4% of theory).

Example 3

83.5 g of dichloromaleic anhydride and 201 g of the tin salt of 2-amino-5-chlorothiophenol are added to 300 g of water, 200 g of N-methylpyrrolidone in 15 g of 100% by weight sulfuric acid in a reactor under nitrogen. This suspension is heated to 60° C. over 2 hours and maintained at 60° C. for 2 hours. Yellow cis-7,7'-chlorobenzothiazineindigo precipitates in the process. 200 g of N-methylpyrrolidone are added dropwise to the reactor and the reaction mixture is heated at 160° C. for 6 hours, resulting in an autogenous pressure of 2 bar.

The suspension is then cooled down to 100° C. and filtered and the filtercake is washed with hot NMP at 90° C. The filtercake is dried under reduced pressure. This gives 178 g of trans-7,7'-chlorobenzothiazineindigo (90% of theory).

Example 4

83.5 g of dichloromaleic anhydride and 180 g of the tin salt of 2-amino-5-methylthiophenol are added to 400 g of water, 250 g of N-methylpyrrolidone in 15 g of 100% by weight sulfuric acid in a reactor under nitrogen. This suspension is heated to 60° C. over 2 hours and maintained at 60° C. for 2 hours. Yellow cis-7,7'-chlorobenzothiazine-indigo precipitates in the process. 200 g of N-methylpyrrolidone are added dropwise to the reactor and the reaction mixture is heated at 160° C. for 6 hours, resulting in an autogenous pressure of 2bar.

The suspension is then cooled down to 100° C. and filtered and the filtercake is washed with hot NMP at 90° C. The filtercake is dried under reduced pressure. This gives 160 g of trans-7,7'-dimethylbenzothiazineindigo (90% of theory).

What is claimed is:

1. A process for preparing symmetrical or asymmetrical trans-thiazineindigo pigments of the formula (1)

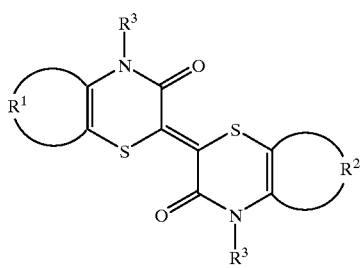
(1)

where $R^1$ and $R^2$ are identical or different and each is a radical required to complete a ring system selected from the group consisting of aromatic carbocyclic ring systems, aromatic heterocyclic ring systems, aliphatic carbocyclic ring systems and aliphatic heterocyclic ring systems, said ring systems optionally being substituted, and $R^3$ is hydrogen, $C_1$–$C_{12}$-alkyl or phenyl, which comprises a) condensing, in an aqueous medium, a compound of the formula (2) with a compound of the formula (3a) or (3b); or a compound of the formula (4) with a compound of the formula (3a), or (3b), or (3a) and (3b)

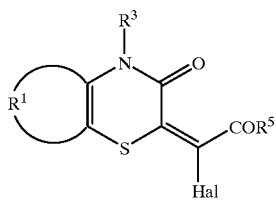
(2)

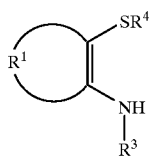
(3a)

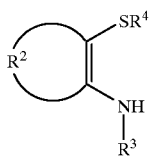
(3b)

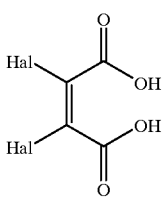
(4)

where $R^4$ is hydrogen or a metal ion selected from the group consisting of $Na^+$, $K^+$ and $Zn^{2+}/2$, $R^5$ is a leaving group, and Hal is Cl or Br;

by maintaining the reaction mixture at a temperature between 30 and 65° C. for at least 1 hour and then b) maintaining the reaction mixture at a temperature between 100 and 180° C. and a pressure between 1.5 and 50 bar for at least 1 hour in the presence of an amide.

2. The process of claim 1, wherein $R^1$ and $R^2$ are each a radical of the formula (a) to (i)

(a)

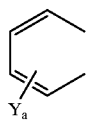
(b)

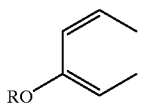
(c)

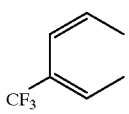
(d)

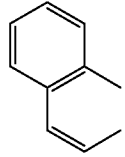
(e)

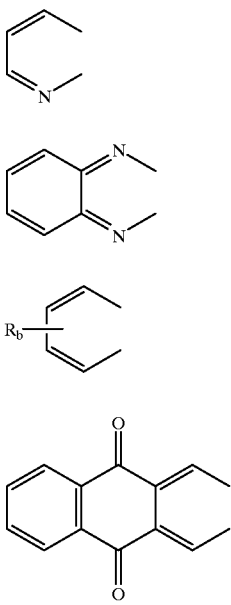

where
Y is halogen or a pseudohalogen,
R is branched or linear $C_1$–$C_8$-alkyl,
a is 1, 2, 3 or 4, and
b is 1, 2, 3 or 4.

3. The process of claim 1, wherein the reaction mixture is maintained at a temperature between 30 and 65° C. for 1 to 6 hours, in step a).

4. The process of claim 1, wherein the reaction mixture is maintained at a temperature between 35 and 50° C. in step a).

5. The process of claim 1, wherein the amide is a cyclic carboxamide or sulfonamide.

6. The process of claim 5, wherein the amide is N-methylpyrrolidone.

7. The process of claim 1, wherein the reaction mixture is maintained at a temperature of between 100 and 180° C. and a pressure between 1.5 and 50 bar for 1 to 8 hours in step b).

8. The process of claim 7, wherein the temperature is between 110 and 150° C.

9. The process of claim 1, wherein the pH is between 0 and 3 in steps a) and b).

10. The process of claim 1, wherein the amide is present in an amount between 5 and 70% by weight, based on the total weight of the reaction mixture.

11. The process of claim 1, wherein the reaction is carried out in the presence of a crystallization inhibitor selected from the group consisting of quinacridonecarboxamid, quinacridonesulfonamides thiazineindigocarboxamides and thiazineindigosulfonamides.

12. The process of claim 1, wherein the reaction mixture is ground during the reaction.

13. The process of claim 1, wherein the water is partially distilled off following step a).

14. The process of claim 1, wherein an aminothiazole of the formula (3c) and/or (3d)

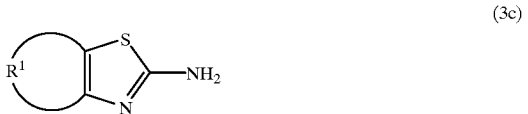

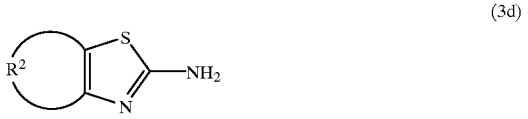

is used and is converted by alkaline ring cleavage into the compound of the formula (3a) and/or (3b).

15. The process of claim 1, wherein the water is completely distilled off following step a).

* * * * *